Oct. 21, 1969     W. R. CAREY ET AL     3,473,824

SAFETY DEVICE

Filed Aug. 18, 1967                        2 Sheets—Sheet 1

INVENTORS
WILLIAM R. CAREY
DAVID P. HASS
BY
Young, Raney, Flynn and Jarolli
ATTORNEYS Oct. 21, 1969  W. R. CAREY ET AL  3,473,824
SAFETY DEVICE Filed Aug. 18, 1967  2 Sheets-Sheet 2

INVENTORS
WILLIAM R. CAREY
DAVID P. HASS
BY
Yount, Raney, Flynn and Tarolli
ATTORNEYS 3,473,824
SAFETY DEVICE
William R. Carey, Farmington, and David P. Hass, Detroit, Mich., assignors to Eaton Yale & Towne Inc., Cleveland, Ohio, a corporation of Ohio
Filed Aug. 18, 1967, Ser. No. 661,598
Int. Cl. B60r 21/02, 21/04
U.S. Cl. 280—150               16 Claims

ABSTRACT OF THE DISCLOSURE

A safety device comprises an inflatable confinement. The inflatable confinement has a contracted position and an expanded position and is inflated to its expanded position by the flow of fluid into the confinement. The kinetic energy of the initial fluid flow into the confinement is absorbed by energy absorbing means. The absorption of the initial kinetic energy of the fluid flowing into the confinement minimizes the impact of the fluid on a forward portion of the confinement, and thus minimizes the impact of the confinement against an occupant of the vehicle during the initial stages of the inflation of the confinement.

---

Figure 1:
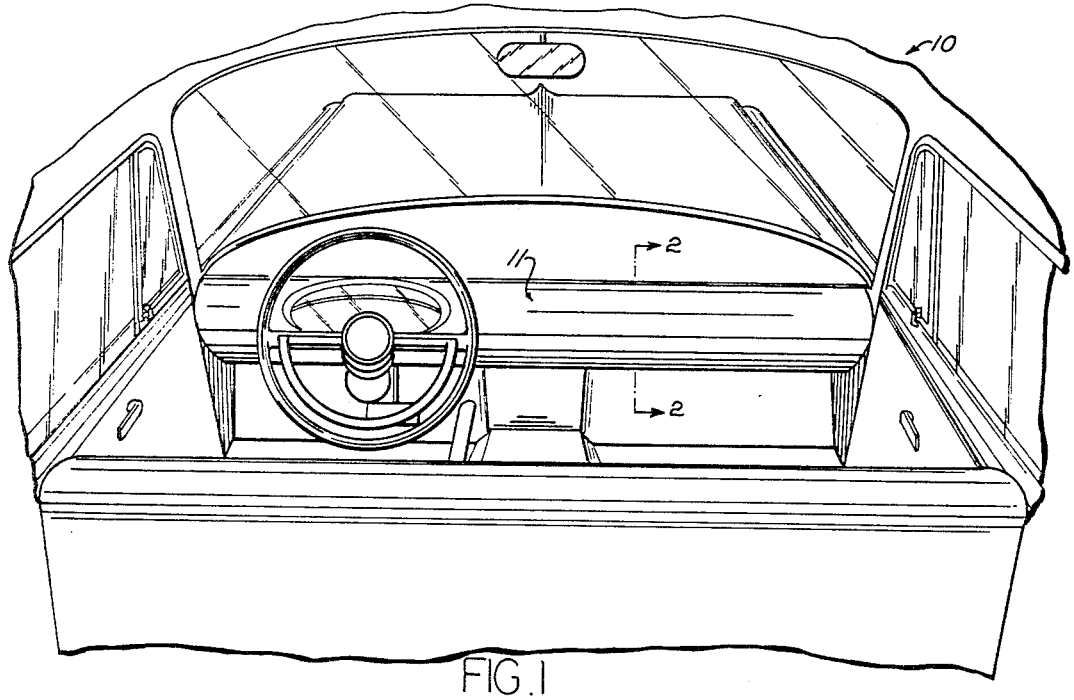

The present invention relates to a safety device and particularly relates to a safety device having a contracted condition and an expanded condition and when in its expanded condition, operates to restrain movement of the occupant of a vehicle during a collision.

Inflatable confinements for controlling movement of an occupant of a vehicle during a collision are known. Such a confinement is shown in application Ser. No. 562,289, now patent No. 3,414,292 assigned to the assignee of the present invention. In such an inflatable confinement, the initial flow of the fluid into the confinement causes the confinement to be rapidly expanded relative to the occupant of the vehicle and, in some circumstances, a forward portion of the confinement may strike the occupant thereby causing injury to the occupant.

The principal object of the present invention is the provision of a new and improved confinement which alleviates the above-noted problem and which is constructed so as to minimize the possibility of a forceful impact of a portion of the confinement with an occupant of the vehicle during the initial stages of the inflation of the confinement.

An important object of the present invention is the provision of a new and improved safety device which comprises an inflatable confinement and which is inflated by the flow of fluid into the confinement, and means for absorbing the kinetic energy of the initial flow of fluid into the confinement.

A further object of the present invention is the provision of a new and improved safety device comprising an inflatable confinement and which is inflated by a flow of fluid into the confinement, and wherein a member is located within the confinement and has a surface portion against which the initial flow of fluid into the confinement impinges.

A still further object of the present invention is the provision of a new and improved safety device comprising a confinement which has a contracted condition and an expanded condition and which is actuated to its expanded condition by a flow of fluid into the confinement, and wherein the confinement includes means for limiting the amount of movement of a forward portion of the confinement relative to the occupant of the vehicle to thereby minimize the possibility of impact of a portion of the confinement on the occupant during a collision.

Still another object of the present invention is the provision of a new and improved safety device comprising an inflatable confinement having a chamber defined by wall means, and wherein burstable means divides the chamber into at least two chamber portions and bursts upon a predetermined pressure in one chamber to provide for flow of fluid from the one chamber into the other chamber.

A still further object of the present invention is the provision of a new and improved safety device, as noted in the next preceding object, wherein the burstable means comprises a flexible member located in the confinement and preferably constituting an inner container located within the inflatable confinement.

Another object of the present invention is the provision of a new and improved safety device for protecting an occupant of the vehicle from impact with a structural part of the vehicle, such as the steering wheel of the vehicle, and wherein the safety device is generally L-shaped so that upon inflation one leg portion of the confinement projects between the occupant of the vehicle and the structural part of the vehicle.

Figure 2:
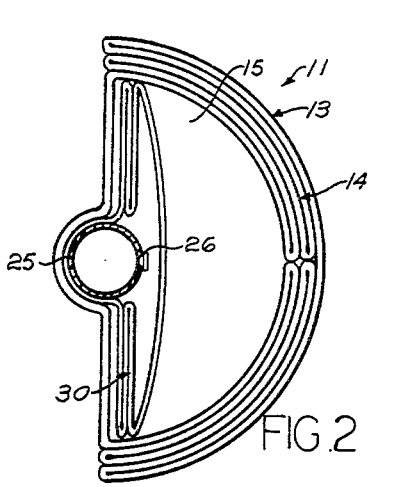
Figure 3:
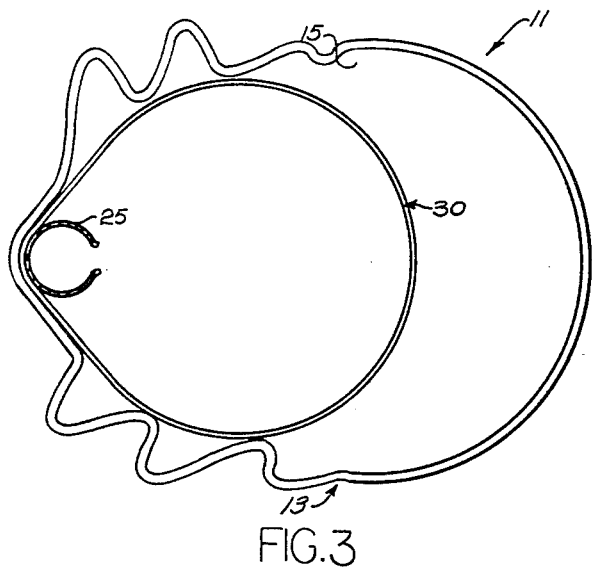
Figure 4:
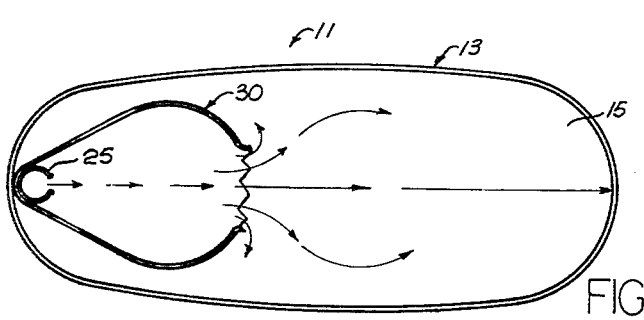
Figure 5:
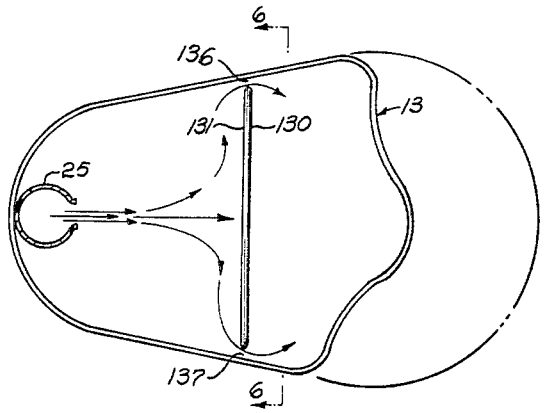
Figure 6:
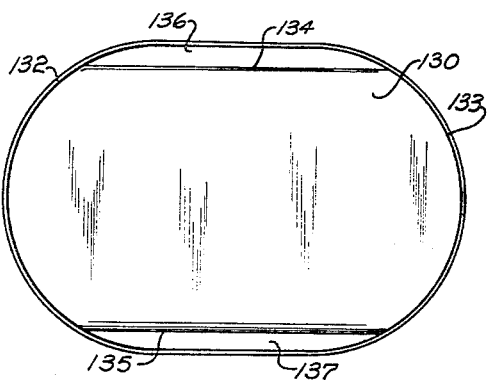
Figure 7:
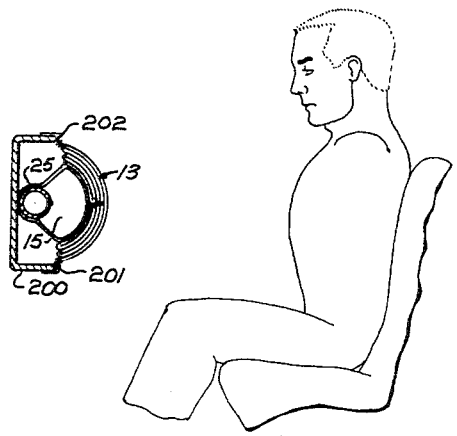
Figure 8:
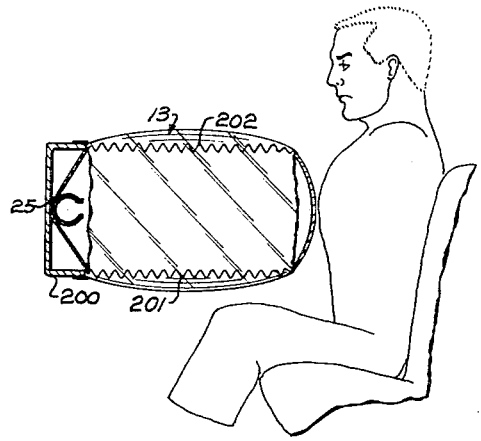
Figure 9:
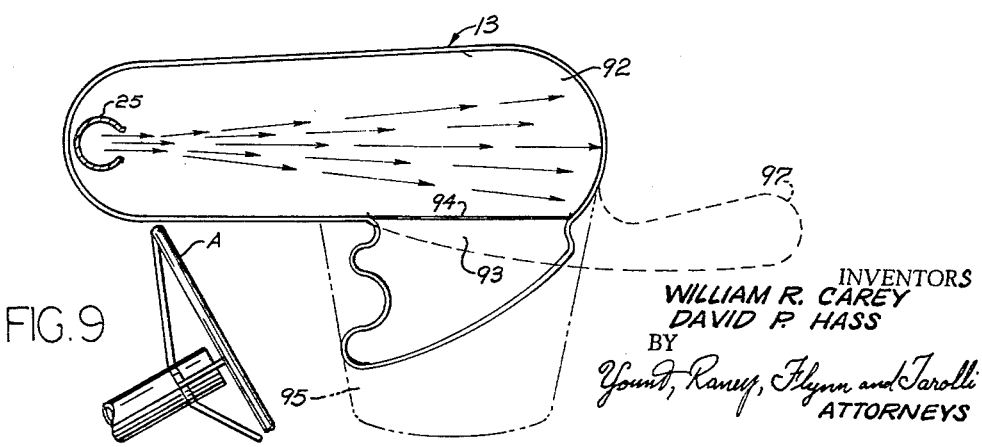

Further objects and advantages of the present invention will be apparent to those skilled in the art to which it relates from the following detailed description of preferred embodiments thereof made with reference to the accompanying drawing forming a part of this specification and in which:

FIG. 1 illustrates a perspective view of a portion of an automotive vehicle embodying the present invention;
FIG. 2 is a cross-sectional view taken approximately along the section line 2—2 of FIG. 1;
FIGS. 3 and 4 are somewhat schematic sectional views of the safety device shown in FIG. 2 in different operative conditions;
FIG. 5 is a schematic view illustrating a modification of the safety device shown in FIG. 2;
FIG. 6 is a view taken along the line 6—6 of FIG. 5;
FIGS. 7 and 8 are schematic views illustrating a still further modification of a safety device embodying the present invention; and
FIG. 9 is a view of still another safety device embodying the present invention.

The present invention relates to safety devices which may be employed in various types of vehicles including automobiles, trucks, airplanes, and the like. For purposes of illustration, a safety device is herein shown and described as being utilized in an automobile 10.

The automobile 10 includes a safety device 11 as illustrated in FIGS. 2–4 and which includes an inflatable confinement 13. The inflatable confinement 13 has a contracted or inoperative position illustrated in FIG. 2 and an expanded or operative position illustrated in FIG. 4. The inflatable confinement 13 is also provided with wall means 14 made of a suitable material which defines a chamber 15. The flow of fluid into the chamber 15 results in inflation or expansion of the confinement 13. The confinement 13 is expanded upon the vehicle encountering a collision condition and when expanded restrains movement of an occupant of the vehicle as a result of the collision.

The wall means 14 of the confinement 13, when the confinement 13 is in the position shown in FIG. 2, may be folded and located in the dash of the vehicle. While the safety device 11 is illustrated as associated with the dash of the vehicle, it should be understood that the safety device 11 could be located in the back of the front seat of the vehicle, in a door, or in any location in the vehicle.

The safety device 11 is expanded from its contracted condition to its expanded condition by the flow of a fluid into the chamber 15. In this conenction, a reservoir 25 of fluid is associated with the confinement 13. The reservoir 25 is located immediately adjacent the confinement, but could be remote therefrom. As illustrated, the supply of fluid has an explosive 26 associated therewith which, when ignited, opens the reservoir 25 and releases fluid therefrom for flow into the confinement 13. The explosive 26 is ignited in any suitable manner, such as by operation of a sensor which operates in response to the vehicle encountering a collision condition. The flow of fluid is illustrated as being directly into the confinement but alternatively could be otherwise, such as a reverse flow where the flow would be initially in the direction opposite that shown.

As the fluid flows from the reservoir 25, it flows, as shown in FIG. 3, against a member in the form of an inner container 30, located with the confinement 13. The inner container 30 has a contracted position, shown in FIG. 2, in which the walls thereof are folded within the chamber 15. The explosive 26 is illustrated schematically and should be associated with the container 30 so that an opening is not formed in the container 30 upon ignition of the explosive 26. The inner container 30 is made of a suitable material which may be folded and expanded by fluid flow into the inner container 30. The material of the inner container 30 bursts upon a predetermined pressure therein.

The initial flow of fluid into the inner container 30 causes the inner container 30 to expand, as shown in FIG. 3 and, at the same time, may cause some movement of the confinement 13 relative to the occupant of the vehicle. As the pressure of the fluid increases in the inner container 30, the inner container 30 bursts due to the pressure of the fluid causing an opening to be formed therein, as shown in FIG. 4, and the fluid then flows from the inner container 30. The flow of fluid from the inner container 30 results in a complete expansion of the confinement 13. Since the initial flow of fluid impinges against the interior wall surface of the inner container 30, the inner container 30 absorbs much of the kinetic energy of the initial flow of fluid. As a result, the initial flow of fluid does not impinge against a wall portion of the confinement 13 and thus minimizes the possibility of a forceful impact of a portion of the confinement 13 against an occupant of the vehicle. The function of absorbing the initial kinetic energy of the fluid flow could be performed by the inner container 30 if rather than being burstable, as illustrated, the walls of the inner container 30 were provided with passages therein through which fluid could flow and the initial fluid flow was directed into the inner container 30.

As noted above, the initial flow of fluid from the reservoir 25 into the inner container 30 may result in some movement of the confinement, as illustrated in FIG. 3. However, the amount of movement of the confinement which results due to the initial flow of fluid into the inner container 30 is limited by the inner container 30. In the event that the inner container 30 was absent from the chamber 15, the initial flow of fluid would be directed against a wall portion of the confinement 13, and the confinement 13 would be moved relative to the occupant by the initial flow of fluid into the confinement 13. This movement of the confinement 13 would be to an extended position, such as illustrated in FIG. 4. However, in view of the fact that the initial flow of fluid impacts or impinges against the wall surface of the inner container 30, the confinement is thus limited in its movement by the initial flow of fluid into the confinement 13, as illustrated in FIG. 3. From the above, it should be apparent that the inner container 30 not only functions to absorb the initial kinetic energy of the fluid flow into the confinement 13, but also limits the distance that the initial flow of fluid into the confinement 13 moves a portion of the confinement.

FIGS. 5 and 6 illustrate a modified embodiment of the present invention in which, rather than the burstable inner container 30, a baffle member 130 is provided in the confinement 13. The baffle member 130 is located in a position so that the initial flow of fluid into the confinement 13 is directed so as to impact against a surface 131 of the baffle member 130.

The baffle member 130 has oposite end portions 132, 133 which are connected with opposite wall portions of the confinement 13. Moreover, as shown in FIG. 6, the upper and lower edge portions 134, 135, respectively, of the baffle member 130 terminate short of the adjacent wall of the confinement 13 and thereby provide fluid passageways 136, 137, respectively, for effecting flow of fluid past the baffle 130 into the portion of the chamber 15 of the confinement 13 which is beyond the baffle member 130. Moreover, the baffle member 130 may be provided with openings or passageways therein in order to effect the desired amount of fluid flow into the portion of the chamber 15 of the confinement beyond the baffle 130.

The baffle member 130 functions in a manner similar to the inner container 30 defined in detail hereinabove with reference to FIGS. 1–4. More specifically, since the initial flow of fluid into the confinement 13 impinges against the surface 131 of the baffle 130, the baffle 130 functions to absorb at least a portion of the kinetic energy of the initial fluid flow into the confinement 13 and thereby minimizes the possibility of a forceful impact of the confinement 13 with an occupant of the vehicle. Moreover, the baffle member 130 functions to limit the distance through which the confinement 13 would be moved by the initial flow of fluid into the confinement 13. As illustrated in FIG. 5, in full lines, the initial flow of fluid into the confinement 13 results in the right-hand portion of the chamber 15 in the confinement 13 not being fully inflated by the initial flow of fluid into the confinement 13. In the event, however, that the baffle member 130 was removed, the confinement 13 would be expanded to a position such as shown in dotted lines in FIG. 5. Thus, the baffle member 130, as does the inner container 30, functions to limit the distance that the initial flow of fluid into the confinement 13 moves a portion of the confinement 13.

FIGS. 7 and 8 illustrate a still further modified embodiment of the present invention in which an inflatable confinement 13 is provided with means for absorbing the initial kinetic energy of the flow of fluid into the confinement 13 in which the means limits the amount of movement of a portion of the confinement 13 by the initial flow of fluid. In the embodiment illustrated schematically in FIGS. 7 and 8, an inflatable confinement 13 is mounted in association with the dashboard of the vehicle, and is shown in a contracted condition in FIG. 7 and in an expanded condition in FIG. 8.

The inflatable confinement 13 is associated with the dashboard of the vehicle when the confinement is in its contracted condition. The confinement 13 is carried by a support member 200 which may comprise any suitable support in the vehicle, and as illustrated, constitutes a support for the dashboard. The reservoir 25 of fluid is released and fluid flows into the chamber 15 of the confinement 13. The flow of fluid into the chamber 15 of the confinement 13 causes the confinement 13 to inflate and take the position illustrated in FIG. 8. When the confinement 13 is expanded into the position shown in FIG. 8, the confinement 13 is located adjacent the occupant of the vehicle so as to receive the impact of movement of the occupant during the collision. The confinement 13 operates to control the movement of the occupant of the vehicle during the collision.

The safety device illustrated in FIGS. 7 and 8 also includes means for absorbing the initial kinetic energy of the fluid flow into the confinement 13 and to limit the movement of a portion of the confinement 13 by the initial flow of fluid into the confinement 13. This means is illustrated schematically in FIGS. 7 and 8 as comprising restraining members 201, 202 which extend from the support 200 to the forward portion of the confinement 13. The restraining members 201, 202 are attached at one end to the support 200 and at the other end to the confinement 13. The restraining members 201, 202 may comprise resilient members which effectively bias the confinement 13 toward the support 200, and thus the flow of fluid into the confinement 13 must overcome the force applied by the restraining members 201, 202 to effect expansion of the confinement 13. Thus, the restraining members 201, 202 may function to absorb a part of the kinetic energy of the fluid flow into the confinement 13. Moreover, the restraining members 201, 202 likewise limit the amount of movement of the forward portion of the confinement 13 relative to the occupant of the vehicle due to the initial flow of fluid into the confinement 13. The restraining members 201, 202, while illustrated schematically as being resilient tapes, other structures, such as a net or possibly even a rigid structure, could be utilized for restraining the movement of the confinement 13 by the initial flow of fluid into the container 30.

The safety device 11 of FIG. 9 comprises the inflatable confinement 13 having the fluid reservoir 25. The inflatable confinement 13, as illustrated, includes a first chamber portion 92 into which the fluid initially flows from the reservoir 25. The confinement 13 includes a second chamber portion 93 which is separated from the chamber portion 92 by a partition member 94. The partition member 94 is relatively weak in construction and bursts upon a predetermined pressure being established in the chamber 92, and upon bursting provides for flow of fluid from the first chamber 92 into the second chamber 93. The dot-dash line 95 shows the formation of the confinement 13 upon complete inflation of the confinement 13 and bursting of the portion 94. The confinement 13, of course, functions to control or restrain the movement of the occupant of a vehicle during a collision, as described.

In the event that the portion 94 of the confinement 13 was eliminated, the 93 of the confinement would be extended outwardly by the initial flow of fluid somewhat into the position illustrated and designated 97 in FIG. 9. Such movement, of course, would result in the portion 97 possibly striking an occupant of the vehicle. As a result, it should be apparent that the portion 94 functions to limit the outward movement of the portion of the confinement forming the second chamber 93 and prevents it from taking the position illustrated and designated 97. As a result, the burstable partition member 94 comprises means for limiting the distance that a portion of the confinement 13 moves due to the initial flow of fluid into the confinement 13.

The confinement 13, as illustrated in FIG. 9, has a generally L-shaped configuration when inflated. The chamber 92 forms one leg of the L-shape and the chamber 93 forms the other leg of the L-shape. As described above, the confinement 13 is inflated in a manner wherein the chamber 92 is inflated first and then subsequently, the chamber 93 is inflated. As a result of this manner of inflation of the confinement 13, the confinement may be readily utilized for protecting an occupant from forceful impact with a projecting portion of the vehicle, such as a steering wheel of the vehicle.

As illustrated in FIG. 9, the steering wheel A of the vehicle is located so that the chamber 92 of the confinement 13 is inflated in a position above the steering wheel A and the chamber 93 of the confinement 13 then inflates between the steering wheel A and the occupant of the vehicle. As a result, the confinement operates to restrain the movement of an occupant of the vehicle into engagement with the steering wheel A of the vehicle.

What is claimed is:

1. A vehicle safety device for protecting an occupant of a vehicle during an accident comprising an expandable confinement having a contracted condition and an expanded condition, said confinement having wall means defining a chamber, said wall means being disposed for receiving the impact of the occupant thereagainst during an accident, a source of fluid, means providing for fluid flow from said fluid source to effect expansion of said confinement, and burstable means located in said chamber and dividing said chamber into at least two chamber portions, said burstable means being burstable by a predetermined pressure resulting from the fluid flow from the source in one chamber portion to effect fluid flow into another chamber portion.

2. A vehicle safety device as defined in claim 1 wherein said another chamber portion is located adjacent the occupant when inflated, and said burstable means limits movement of a portion of said wall means defining said another chamber upon initial flow of fluid into said confinement.

3. A vehicle safety device comprising an inflatable confinement having an inoperative condition and an operative condition for receiving the impact of an occupant thereagainst during a vehicle collision, said confinement having means defining a chamber therein, a supply of fluid, means for releasing said fluid supply to actuate said confinement to said operative condition, and energy absorbing means distinct from said means for absorbing at least a portion of the kinetic energy of the initial flow into said confinement, said energy absorbing means comprising a member located in said chamber in the path of the initial fluid flow into said confinement and against which at least said initial fluid flow impinges, said member comprising an inflatable container into which said initial fluid flows, said container having at least a portion which provides for fluid flow into said chamber of said confinement.

4. A vehicle safety device comprising an inflatable confinement having an inoperative condition and an operative condition for receiving the impact of an occupant thereagainst during a vehicle collision, said confinement having means defining a chamber therein, a supply of fluid, means for releasing said fluid supply to actuate said confinement to said operative condition, and energy absorbing means distinct from said means for absorbing at least a portion of the kinetic energy of the initial flow into said confinement, said energy absorbing means comprising a member located in said chamber in the path of the initial fluid flow into said confinement and against which at least said initial fluid flow impinges, said member comprising in inflatable container into which said initial fluid flows, said container having a burstable portion which bursts upon a predetermined pressure increase therein to provide for fluid flow into said chamber of said confinement.

5. A safety device for protecting an occupant of a vehicle during a collision comprising an inflatable confinement having an inoperative condition and an operative condition, said confinement having means defining a chamber, said means being disposed for receiving the impact of the occupant thereagainst during a collision, a supply of fluid, means for releasing said fluid supply to actuate said confinement to said operative condition, means operable to limit the distance through which a portion of said confinement is moved by the initial gas flow into said confinement, said last-recited means comprising a member located in said confinement to restrict said initial fluid flow against said portion of said confinement, said member comprising an inflatable container into which said initial fluid flows, said container having a burstable portion which bursts upon a predetermined pressure resulting from the fluid flow from the source increase therein to provide for fluid flow therefrom.

6. A vehicle safety device comprising a fluid source, means providing for fluid flow from said fluid source, first expandable means having a collapsed condition and an expanded operative condition, said first expandable means being expanded by the fluid flow and operable to control the fluid flow when expanded, second expandable means having an inoperative collapsed condition and an operative expanded condition receiving the impact of a vehicle occupant thereagainst during an accident, and means providing for fluid communication between said first expandable means and said second expandable means to effect expansion of said second expandable means.

7. A vehicle safety device as defined in claim 6 wherein said member comprises a baffle extending between opposite portions of said first recited means and having a surface portion against which the fluid impinges, said baffle having means providing for fluid flow past said baffle.

8. A safety device as defined in claim 6 wherein said first expandable means comprises an expandable container into which fluid from said fluid source flows and which container is made of a flexible material.

9. A vehicle safety device as defined in claim 6 wherein said first expandable means comprises a member located within said second expandable means.

10. A safety device as defined in claim 8 wherein said expandable container is located in said second expandable means and has at least a portion which provides for fluid flow therefrom into said second expandable means.

11. A vehicle safety device comprising an expandable confinement having an inoperative condition and an operative condition for receiving the impact of an occupant thereagainst during a vehicle accident, a fluid source, means providing for fluid flow from said fluid source to expand said confinement to said operative condition, and energy absorbing means for absorbing at least a portion of the kinetic energy of the initial fluid flow for expanding said confinement, said energy absorbing means comprising a member made of a flexible material located in said confinement and against which the initial fluid flow acts, said member comprising an expandable container located in said confinement and having a collapsed inoperative condition and an expanded operative condition to which it is expanded by fluid flow, said container having at least a portion which provides for fluid flow therefrom into said confinement.

12. A safety device for protecting an occupant of a vehicle during an accident comprising an expandable confinement having a collapsed inoperative condition and an expanded operative condition for receiving the impact of the occupant thereagainst during an accident, a source of fluid, means for providing fluid flow from said source to expand said confinement to said operative condition, and means operable to limit the distance through which a portion of said confinement is moved by the initial fluid flow for expanding said confinement, said last-recited means being operatively connected with the confinement and having a collapsed condition and an expanded condition to which said means is operated by said fluid flow.

13. A safety device as defined in claim 12 wherein said last-recited means comprises an expandable container located in said confinement and into which fluid flows, said expandable container having at least a portion which provides for fluid flow therefrom into said confinement.

14. A safety device as defined in claim 12 wherein said last-recited means comprises a baffle member extending between opposite portions of said confinement and having a surface portion against which the fluid impinges.

15. A safety device as defined in claim 12 wherein said last-recited means comprises resilient restraining means connected between the confinement and a structural part of the vehicle.

16. A vehicle safety device as defined in claim 12 wherein said confinement has a first portion for projecting between the occupant of the vehicle and a structural part of the vehicle and a second portion which is connected with the vehicle and from which said first portion projects, said second portion of said confinement extending from the vehicle to a position beyond said structural part of the vehicle, and said last-recited means comprising a burstable partition member separating said first and second portions, said partition member bursting upon a predetermined pressure being created in said second portion to provide for fluid flow into said first portion.

References Cited

UNITED STATES PATENTS 2,850,291　9/1958　Ziccardi _____ 280—150

BENJAMIN HERSH, Primary Examiner

J. E. SIEGEL, Assistant Examiner